United States Patent [19]

Foster

[11] Patent Number: 4,561,875
[45] Date of Patent: Dec. 31, 1985

[54] MOULD ARRANGEMENT FOR A CYCLICLY OPERATING GLASSWARE FORMING MACHINE

[75] Inventor: Thomas V. Foster, Doncaster, England

[73] Assignee: Emhart Industries, Inc., Farmington, Conn.

[21] Appl. No.: 682,210

[22] Filed: Dec. 17, 1984

[30] Foreign Application Priority Data

Dec. 20, 1983 [GB] United Kingdom ............... 8333900

[51] Int. Cl.⁴ .............................................. C03B 9/38
[52] U.S. Cl. ....................................... 65/267; 65/319; 65/356; 65/361
[58] Field of Search ................ 65/319, 320, 356, 361, 65/267

[56] References Cited

U.S. PATENT DOCUMENTS

| 4,251,253 | 2/1981 | Becker et al. | 65/267 |
| 4,388,099 | 6/1983 | Hermerling et al. | 65/267 |
| 4,490,164 | 12/1984 | Nebelung et al. | 65/319 X |

Primary Examiner—Robert Lindsay
Attorney, Agent, or Firm—H. Samuel Kieser

[57] ABSTRACT

The mould arrangement comprises two supports which support movable side portions of a mould and two plenum chambers each associated with one of the supports and movable therewith. Each plenum chamber extends above the mould side portion without obstructing an upwardly-opening entrance to the mould and has one or more exits which communicate with entrances of cooling passages formed in the side portion. Air supplied to the plenum chambers passes through the exits into the cooling passages and serves to cool the side portions.

12 Claims, 4 Drawing Figures

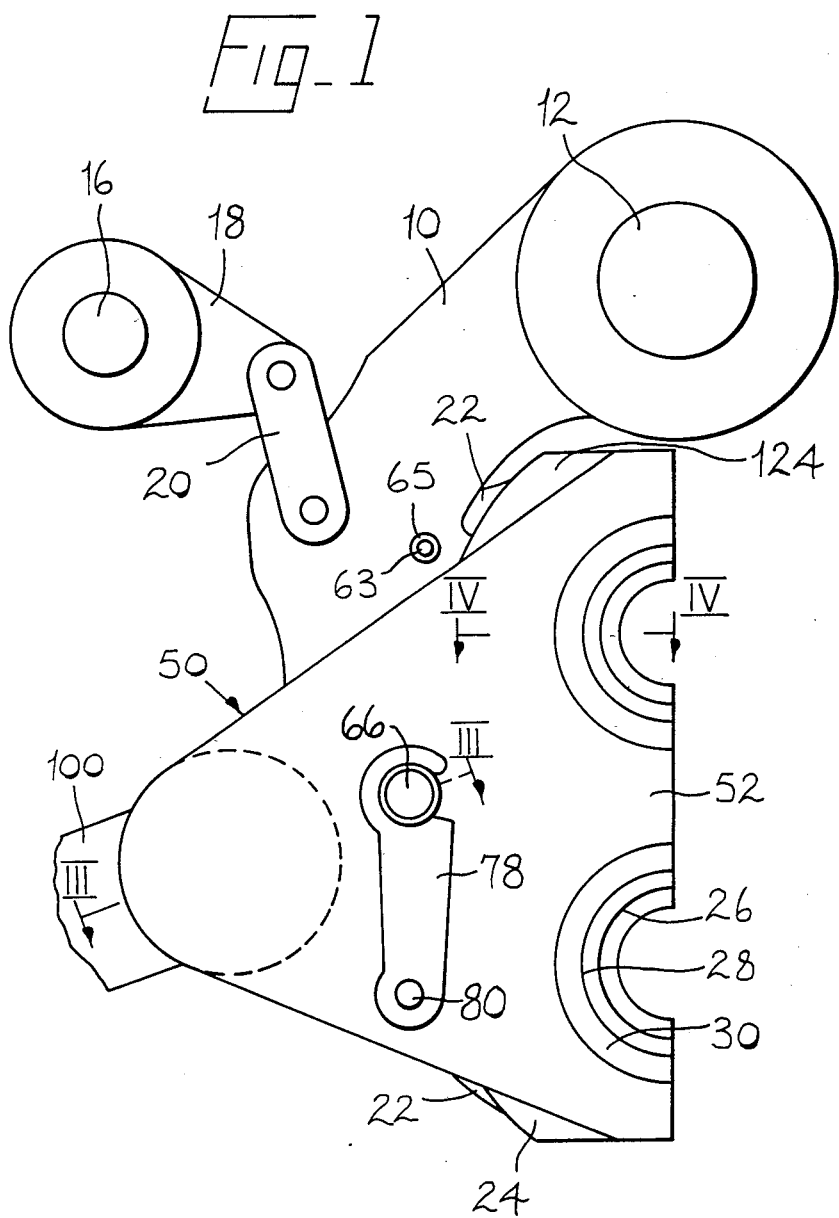

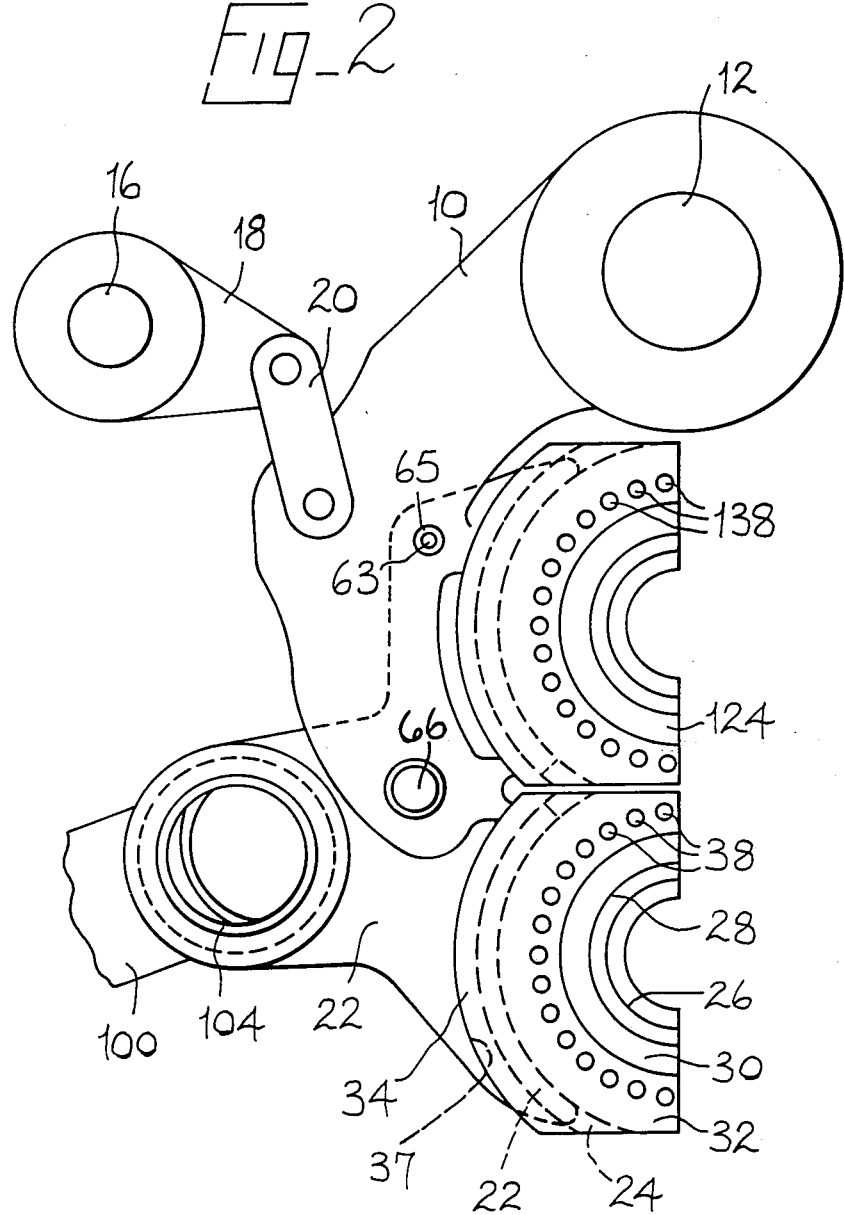

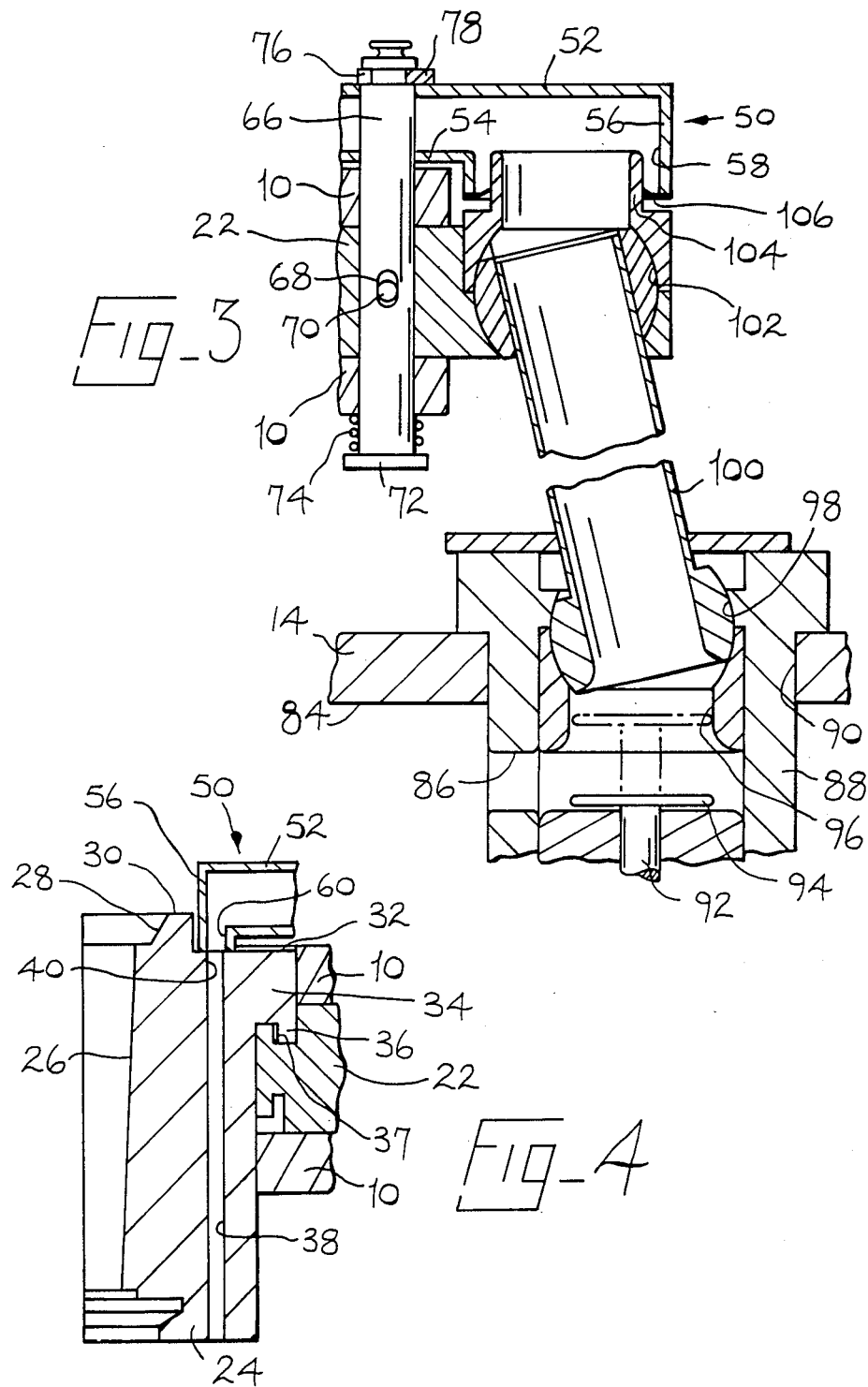

MOULD ARRANGEMENT FOR A CYCLICLY OPERATING GLASSWARE FORMING MACHINE

BACKGROUND OF THE INVENTION

This invention is concerned with a mould arrangement for use in a cyclicly operating glassware forming machine, the arrangement comprising two supports on each of which one of two opposed side portions of a mould is mounted, each side portion defining side portions of a cavity of the mould which has an upwardly-facing opening through which molten glass can be introduced into the cavity to be moulded to the shape of the cavity, the supports being movable in a cycle of operation of the machine to a first position thereof, in which the side portions engage one another to co-operate in defining the mould cavity so that moulding can take place, and to a second position thereof, in which the side portions are separated from one another so that the moulded glass can be removed from the mould.

In a glass container manufacturing machine of the so-called "individual section" type, a number of container making units or sections are arranged side by side, are fed with glass from a common source, and feed their output to a common conveyor. Each of these sections has a parison mould arrangement by which a parison is formed from a gob of molten glass delivered thereto, and a blow mould arrangement by which parisons are blown to the shape of the container. Both the parison mould arrangement and the blow mould arrangement comprise two supports and mould side portions as described in the last preceding paragraph. The side portions of the parison mould arrangement co-operate with neckrings of an invert mechanism of the machine to form a parison mould, the invert mechanism being operable to transfer parisons from the parison mould arrangement to the blow mould arrangement. The side portions of the blow mould arrangement co-operate with a stationary bottom plate to form the blow mould. The parison is formed in the parison mould arrangement in an inverted condition either by pressing or by blowing and is inverted as it is transferred to the blow mould arrangement where it is blown to the shape of the required article of glassware.

Since the moulds of an individual section type machine absorb heat from the glass at the rate which is faster than the heat can be dissipated to the surrounding atmosphere without additional cooling, such moulds are supplied with cooling means which cool the mould so that it remains at a substantially constant average temperature during successive operations of the machine. Because the sections of an individual section type machine need to be close together, for reasons of glass supply, only very limited space is available around the mould for the provision of cooling means. One solution to this problem is to feed cooling air through the frame of the machine section to a vertical cooling stack which is provided with nozzles which direct the air on to the outside of the mould. This solution, however, has the disadvantage that the supports supporting the side portions of the mould interfere with the flow of air to the mould and also it is difficult to provide differential cooling around the mould as is desirable. Furthermore, such cooling stacks are a source of undesirable noise. In another type of cooling means, cooling air is supplied through the supports to a chamber around the mould. This type has the disadvantage that it requires expensive machining of the supports, to allow both for the movement of the supports and for the flow of the cooling air. Furthermore, as a seal has to be provided between the support and the side portion of the mould, delays occur in changing moulds and the cost of the mould is increased. It is also difficult to provide differential cooling around the mould. Attempts have also been made to cool moulds by passing cooling air through passages in the side portions thereof. Examples can be found in U.K. Patent Specification No. 1337292 and U.S. Patent Specification No. 4251253 (FIGS. 10 to 12). In these arrangements, air is brought through the supports to the passages through pipes. Thus, expensive machining of the supports is required and also pipe connections are involved between the supports and the mould portions thereby causing delay to mould changes and increasing the cost of the moulds. Furthermore, in these arrangements the cooling air makes sharp changes of direction in the mould so that considerable resistance to the air flow is created requiring the use of high pressure air to achieve adequate air flow. The use of high pressure air is undesirable because of the expense involved. Furthermore, non-uniform air flow is created distorting the cooling effect and making it difficult to predict. Thus, it becomes difficult to predict where to position the cooling passages to achieve the optimum cooling effect. If the passages are not initially correctly positioned, the cooling effect can be adjusted by inserting plugs or insulating sleeves into the passages but this is a time-consuming trial-and-error method because the effects of the plugs and/or sleeves are again hard to predict.

In the specification of European Patent Application No. 83304985.1, (Publication No. 01 02 820) there is described a mould arrangement in which passages in the side portions of the mould can be supplied with cooling air at a substantially uniform pressure and with a uniform flow pattern so that the above-mentioned disadvantages of previous cooling systems are overcome. In that mould arrangement, the cooling passages in each side portion each have an entrance in a bottom surface of that side portion and the mould arrangement also comprises a plenum chamber extending beneath the first or the second position of each side portion and having one or more exits which open upwardly and communicate, when the side portion is above the plenum chamber, either directly or through vertical passages in a bottom plate of the mould with the entrances of the cooling passages so that air is supplied to each cooling passage at substantially the same pressure, the plenum chamber also having an entrance connected to air supply means operable to blow air into the plenum chamber. This mould arrangement achieves excellent results with blow mould arrangements but is difficult to apply to parison mould arrangements because of the presence beneath the side portions of the mould of the neckring and either a parison blowing arrangement or a parison pressing arrangement.

It is an object of the present invention to provide a mould arrangement in which passages in the side portions of the mould can be supplied with cooling air at a substantially uniform pressure and with a uniform flow pattern and which is readily applicable to parison mould arrangements.

BRIEF SUMMARY OF THE INVENTION

The invention provides a mould arrangement for use in a cyclicly operating glassware forming machine, the arrangement comprising two supports on each of which one of two opposed side portions of a mould is mounted, each side portion defining side portions of a cavity of the mould which has an upwardly-facing opening through which molten glass can be introduced into the cavity to be moulded to the shape of the cavity, the supports being movable in a cycle of operation of the machine to a first position thereof, in which the side portions engage one another to co-operate in defining the mould cavity so that moulding can take place, and to a second position thereof, in which the side portions are separated from one another so that the moulded glass can be removed from the mould, the side portions also defining cooling passages each extending downwardly from an entrance in an upper surface of the side portion so that air can pass through the passages to cool the side portion, wherein the mould arrangement also comprises two plenum chambers each of which is associated with a separate one of the supports and is mounted for movement therewith, each plenum chamber extending above the upper surface of the side portion mounted on its associated support without obstructing the opening of the cavity, each plenum chamber having one or more exits which open downwardly and communicate with the entrances of the cooling passages in said side portion so that air supplied to the plenum chamber is applied to each cooling passage at substantially the same pressure, each plenum chamber also having an entrance connected to air supply means operable to blow air into the plenum chamber.

In a mould arrangement according to the last preceding paragraph, air reaches the entrance of each of the cooling passages at substantially the same pressure, this being ensured by the plenum chambers. The term "plenum chamber" where used herein refers to a chamber whose exit or exits are sufficiently remote from its entrance and whose volume is sufficiently large that a substantially uniform pressure is created across the exit or exits of the chamber. Furthermore, the straight flow paths for the cooling air reduce non-uniform air flow to a minimum. Accordingly, it is possible to predict accurately the cooling effect of each passage and the distribution of cooling around the cavity can be controlled by positioning of the passages as determined by mathematical models constructed to obtain an optimum cooling distribution. Furthermore, the flow of cooling air is not interfered with by the supports of the side portions. The mould arrangement may suitably be a parison mould arrangement but it can also be a blow mould arrangement.

The passages in the side portions of the mould may be formed by bores through the side portions themselves or by spaces between fins of the side portions, in which case, the open side of the space may be closed by an external jacket attached to the side portion to prevent air from escaping from the passage.

In order to ensure that there is a good seal between the exit or exits of each plenum chamber and the entrances of the cooling passages, each plenum chamber may be mounted on its associated support and the portion of the plenum chamber defining the exit or exits thereof may be urged into contact with the upper surface of the side portion by resilient means.

To enable the conventional method of mounting a mould side portion on its support to be used, this method involving a hook portion of the side portion which projects horizontally above the support and has a downward projection which is received in an upwardly-opening recess of the support, the plenum chambers may be mounted so that they project over said hook portions, the plenum chambers being removable from the supports to allow mounting of the side portions on the supports or removal of the side portions from the supports.

Conventionally, each support of a mould arrangement is mounted for limited pivoting movement about a vertically-extending shaft which is movable with the support. Where this is the case, conveniently, the shaft projects upwardly through aligned holes in bottom and top walls of the plenum chamber and defines a recess above said top wall which is arranged to receive a latching member mounted on said top wall for movement between a locking position thereof, in which the latching member enters the recess in the shaft and thereby locks the plenum chamber to the shaft, and an out-of-the-way position thereof, in which the latching member allows the plenum chamber to be mounted on the support or to be removed therefrom. In order to ensure a good seal between the exit or exits of the plenum chamber and the entrances of the cooling passages, the shaft may be urged downwardly of the support by resilient means so that, when the latching member is in its locking position the portion of the plenum chamber defining the exit or exits thereof is urged into contact with the upper surface of the side portion.

In order to achieve better control of the cooling by enabling the cooling period to be varied, the entrance of each plenum chamber may be connected to the air supply means through a valve which is arranged to allow air to enter the plenum chamber for a predetermined time in each cycle of operation of the machine.

In order to facilitate removal of and replacement of plenum chambers on the supports, the air supply means may be connected to a tubular portion of the support which is arranged to enter the entrance of the plenum chamber when the plenum chamber is mounted on the support, the arrangement also comprising a flexible sealing member arranged to seal the gap between the exterior of the tubular portion and the plenum chamber walls.

Conveniently, the support may comprise a partially-spherical bearing on which an end portion of an air supply tube of the air supply means is mounted, an opposite end portion of the air supply tube being mounted on a partially-spherical bearing on the frame of the machine so that the tube communicates with a chamber within the frame to which air under pressure is applied. In this way, the movement of the support is accommodated by movement of the air supply tube on its bearings.

Where each support is arranged to support one or more further side portions of further moulds as is the case with machines which are operating in the double or triple gob modes, each plenum chamber may have one or more further exits which open downwardly and communicate with entrances of cooling passages in the further side portion or portions. In this way, two plenum chambers can accommodate all the moulds mounted on two supports.

In order to maximise air use, it is advantageous if each cooling passage extends substantially in a straight line between its entrance and an exit thereof to atmosphere so that the mass flow of air in the passage is determined by the cross-sectional area and length of the passage and entrance and exit configurations of the passage and not by bends or inserts in the passage or by valves associated with the passage.

In order to achieve more efficient cooling, it is advantageous if the Reynolds Number for air flowing through the cooling passages is arranged to be greater than 10,000. Preferably the Reynolds Number should exceed 20,000. The Reynolds Number is defined as the velocity of the air multiplied by the diameter of the passage divided by the kinematic viscosity of the air, the kinematic viscosity being the dynamic viscosity divided by the density. Since the air is heated in flowing through the cooling passage, the Reynolds number will vary along the passage. For example, for a passage of 7 mm diameter and 200 mm long with an entrance pressure of 500 mm of water and entrance temperature of 20° centigrade, the Reynolds number would be between 28,000 and 23,000.

In order to provide suitable pressure in the plenum chambers, the air supply means may be arranged to create a pressure of up to 2 lbs per square inch (1400 mm of water) at the exits of the plenum chamber.

In order to obtain even more uniform pressures at the entrances of the cooling passages, it is advantageous if each plenum chamber has a maximum cross-sectional area transversely to the direction of air flow therein which is at least three times the combined cross-sectional areas of the cooling passages supplied from the plenum chamber.

BRIEF DESCRIPTION OF THE DRAWINGS

There now follows a detailed description, to be read with reference to the accompanying drawings of a mould arrangement which is illustrative of the invention. It is to be understood that the illustrative mould arrangement has been selected for description by way of example and not of limitation of the invention.

In the drawings:

FIG. 1 is a plan view of the illustrative mould arrangement;

FIG. 2 is a plan view, similar to FIG. 1, but showing a plenum chamber of the illustrative mould arrangement removed;

FIG. 3 is a cross-sectional view taken on the line III—III in FIG. 1; and

FIG. 4 is a cross-sectional view taken on the line IV—IV in FIG. 1.

DETAILED DESCRIPTION OF PREFERRED EMBODIMENT OF THE INVENTION

The illustrative mould arrangement is for use in a cyclicly operating glassware forming machine of the individual section type. The arrangement comprises two arms 10 (only one shown in the drawings) which are mounted for pivoting movement about a vertically extending shaft 12 so that the arms 10 can be pivoted about the shaft 12 towards one another or away from one another. The shaft 12 is supported by a frame 14 of the machine which also supports a shaft 16 associated with each of the arms 10. Each shaft 16 is mounted on the frame 14 to turn about a vertical axis thereof and has a horizontally projecting arm 18 which is pivotally connected to the associated arm 10 by means of a link 20. The arrangement is such that, when the shaft 16 is turned about its vertical axis by turning means (not shown) of the machine, the arm 10 is caused to turn about the shaft 12. Each of the arms 10 is split into an upper portion and a lower portion (see FIG. 3) between which a support 22 of the mould arrangement is mounted. Thus, the mould arrangement comprises two supports 22, one on each of the arms 10.

Each of the supports 22 has one of two opposed side portions 24 of a mould mounted thereon. Since only one of the arms 10 is shown in the drawings, only one of the supports 22 and one of the mould portions 24 is shown but the other arm 10, the other support 22, and the other mould portion 24 and parts associated therewith are formed as mirror images of the parts shown in the drawings and therefore do not require to be shown therein. Each side portion 24 defines side portions of a cavity 26 of a mould which has an upwardly facing opening 28 (See FIG. 4) through which molten glass can be introduced into the cavity 26 to be moulded to the shape of the cavity. The mould is a parison mould in which a gob of molten glass is received, in the operation of the machine, and is moulded into a parison. The opening 28 is formed in a raised portion 30 of an upper surface 32 of the mould portion 24 and is arranged to receive, in the operation of the machine, firstly a funnel which guides the gob into the cavity 26 and secondly a baffle which closes the opening 28 to allow moulding of the parison to take place.

The supports 22 are movable in a cycle of operation of the machine to a first position thereof (shown in the drawings), in which the side portions 24 engage one another to co-operate in defining the mould cavity 26 so that moulding can take place, and to a second position thereof (reached by moving the arm 10 shown in the drawings clockwise about the shaft 12 and the arm 10 which is not shown in the drawings anti-clockwise about the shaft 12), in which the side portions 24 are separated from one another so that the moulded glass parison can be removed from the mould. This movement is achieved by turning the shaft 16 which is shown in the drawings and also simultaneously the shaft 16 which is not shown in the drawings to move the arms 10 and therefore the supports 22 carried by the arms 10. The construction described hitherto is well known to those skilled in the art.

Each side portion 24 of the mould is mounted on its support 22 by means of a hook portion 34 of the side portion 24 which projects horizontally above the support 22 and has a downward projection 36 which is received in an upwardly-opening recess 37 of the support 22. Both the downward projection 36 of the hook portion 34 and the recess 37 of the support 22 are arcuate when viewed in plan and the portion 24 hangs on the support 22 in a manner which is well known.

The side portions 24 of the mould also define cooling passages 38 which each extend downwardly from an entrance 40 in the upper surface 32 of the side portion 24. The cooling passages 38 are arranged so that air can pass through the passages to cool the side portion 24. The cooling passages are formed by bores of circular cross-section.

The illustrative mould arrangement also comprises two plenum chambers (only one shown in the drawings) generally indicated by 50. Each plenum chamber is associated with a separate one of the supports 22 and is mounted for movement therewith. Each plenum chamber has a top wall 52, a bottom wall 54, and side walls 56. The bottom wall 54 defines a circular entrance 58 of the plenum chamber 50 and also fifteen circular exits 60 of the plenum chamber 50. There is one exit 60 for each entrance 40 and there may be more or less than fifteen such exits. Each plenum chamber 50 extends above the upper surface 32 of the side portion 24 mounted on its associated support 22 but without obstructing the opening 28 of the cavity 26. In order to avoid obstructing the opening 28, the plenum chamber 50 has an arcuate side wall 56 which extends parallel to the raised portion 30 which borders the opening 28 of the side portion 24. Thus, the presence of the plenum chamber 50 does not prevent the entry of gobs of molten glass into the cavity 26 nor the positioning of a funnel or a baffle on the mould portion 24. The plenum chambers project over the hook portions 34 of the side portions 24 but, as will appear from the description below, are removable from the supports 22 to allow mounting of the side portions 24 on the supports 22 or removal of the side portions 24 from the supports 22.

Each support 22 is mounted for limited pivoting movement on the arm 10 about a vertically extending shaft 66 which is movable with the support 22 and the arm 10 to move the side portion 24. The pivoting is limited by a pin 63 which projects from the support 22 into a hole 65 in the arm 10. A horizontally extending pin 68 mounted on the support 22 enters a vertically extending slot 70 in the shaft 66 so that the shaft 66 is secured to the support 22 but can slide vertically relative thereto by a limited amount. The shaft 66 extends through aligned holes in the upper and lower portions of the arm 10 and can rotate relative to these portions and slide relative to them by an amount limited by the extent of the slot 70. A lower end portion of the shaft 66 has an enlarged head 72 beneath the lower portion of the arm 10, the head 72 being urged downwardly by resilient means provided by a spring 74 which acts between the lower portion of the arm 10 and the head 72. The shaft 66 also projects upwardly through aligned holes in the bottom wall 54 and the top wall 52 of the plenum chamber 50 and defines an annular recess 76 extending around the shaft 66 above the top wall 52. The recess 76 is arranged to receive a latching member 78 (see FIG. 1) which is mounted on the top wall 52 for movement between a locking position thereof (shown in FIG. 1 and FIG. 3), in which the latching member 78 enters the recess 76 in the shaft 66 and thereby locks the plenum chamber to the shaft 66, and an out-of-the-way position thereof, in which the latching member 78 allows the plenum chamber 50 to be mounted on the support 22 or to be removed therefrom. The latching member 78 is mounted on the top wall 52 for pivoting movement about a pin 80 and reaches its out-of-the-way position by moving anti-clockwise from the position in which it is shown in FIG. 1 so that it does not engage the shaft 66. The shaft 66 is urged downwardly of the support 22 by the spring 74 so that, when the latching member 78 is in its locking position, the plenum chamber 50 is also urged downwardly and the portion of the plenum chamber 50 defining the exits 60 thereof is urged into contact with the upper surface 32 of the side portion 24. The exits 60 of the plenum chamber 50 therefore open downwardly and are arranged above the entrances 40 of the passages 38 so that the exits 60 communicate with the entrances 40 so that air supplied to the plenum chamber 50 is supplied to each cooling passage 38. The arrangement of the plenum chamber 50 is such that air is supplied to each cooling passage 38 at substantially the same pressure. In a modification of the illustrative mould arrangement, the exits 60 may be replaced by a single exit formed by an arcuate slot which communicates with all the entrances 40 of the mould side portion 24. The shaft 66 may be made adjustable in length to accommodate differing mould heights, for example a portion of the shaft 66 may screw into or out of another portion, a locking member being provided to maintain an adjustment once made.

The entrance 58 of each plenum chamber 50 is connected to air supply means operable to blow air into the plenum chamber 50. The air supply means comprises a fan (not shown) which is operable to blow air into a chamber 84 formed in the frame 14. The chamber 84 communicates through a passage 86 with the interior of a valve block 88 mounted in an upwardly facing aperture 90 in the frame 14. The valve block 88 contains a plunger 92 operable by means of a solenoid (not shown) or by other means to move a closure member 94 mounted on the plunger 92 between an open position thereof, shown in FIG. 3, and a closed position thereof, shown in broken line in FIG. 3. When in its open position, the closure member 94 allows the air to enter a cylindrical passage 96 which leads to a partially-spherical bearing 98 formed in the valve block 88 and, when in its closed position, the closure member 94 prevents air from entering the passage 96. The partially-spherical bearing 98 is therefore mounted on the frame 14 of the machine and an end portion of an air supply tube 100 is mounted on the bearing 98 for movement about a central point of the bearing 98. Air entering the passage 96 enters the tube 10 and is conveyed to an opposite end portion of the tube 100 which is mounted on a partially-spherical bearing 102 on the support 22 for movement about a central point of the bearing 102. The tube 100 may have two telescopic portions spring-loaded apart to urge the ends of the tube firmly into the bearings 98 and 102. Air leaves the tube 100 and enters a tubular portion 104 of the support 22 which is arranged to enter the entrance 58 of the plenum chamber 50 when the plenum chamber 50 is mounted on the support 22. A flexible sealing member 106 mounted on the plenum chamber 50 is arranged to seal the gap between the exterior of the tubular portion 104 and the walls of the plenum chamber 50. The sealing member 106 may alternatively be of the floating type. The valve formed by the closure member 94, its plunger 92 and the solenoid which moves the plunger 92 is arranged to allow air to enter the plenum chamber 50 for a predetermined time in each cycle of operation of the machine so that in each cycle of operation of the machine the closure member is moved between its closed position and its open position and back again. Thus, for a predetermined period in each cycle of operation of the machine, air can flow from the chamber 84, through the passage 86, through the passage 96, through the tube 100 and through the tubular portion 104 into the plenum chamber 50. In a modification of the illustrative mould arrangement, the bearings 98 and 102 and the tube 100 may be replaced by a flexible tube.

Each support 22 of the illustrative mould arrangement is also arranged to support a further side portion 124 of a further mould and each plenum chamber 50 has further exits 60 which open downwardly and communicate with entrances of cooling passages 138 in the further side portion 124. The further side portion 124 is identical in construction to the portion 24 and is mounted on the support 22 in identical manner. Thus, the illustrative mould arrangement is arranged to operate in the double gob mode and, in modifications of the illustrative mould arrangement, it is possible to mount only one mould side portion or more than two sets of side portions on the suport 22.

Each cooling passage 38 or 138 extends (as can be seen from FIG. 4) substantially in a straight line between its entrance and an exit thereof to atmosphere at the lower end of the side portion 24 or 124 so that the mass flow of air in the passage is not affected by bends or other obstructions but is determined by the cross-sectional area and the length of the passage and entrance and exit configurations of the passage.

The air supply means of the illustrative mould arrangement is arranged to create a pressure of up to 2 lbs per squar inch at the exists 60 (1400 mm of water). Ideally, the Reynolds number for the air flowing through the cooling passages 38 or 138 is arranged to be greater than 10,000, preferably greater than 20,000.

In order to ensure that the distribution of pressure is uniform over the exits 60 of the plenum chamber 50, the plenum chamber 50 is arranged to have a maximum cross-sectional area transversely to the direction of air flow from the entrance 58 to the exits 60 which is at least three times the combined cross-sectional areas of the cooling passages 38 and 138 supplied from the plenum chamber 50. In the illustrative mould arrangement, the width of the plenum chamber 50 reaches 190 mm before the exits 60 are encountered and has a height of 18 mm at that point, the cross-sectional area therefore being 3420 square mm. The passages 38 and 138 each have a diameter of 6 mm and there are 30 passages supplied from the plenum chamber 50 so that the combined cross-sectional areas of the cooling passages 38 and 138 is approximately 849 square mm giving a ratio between the aforementioned areas of approximately 4.

In order to use the illustrative mould arrangement, the plenum chamber 50 is removed therefrom by moving the latching member 78 into its out-of-the-way position and lifting the plenum chamber 50 off the support 22. The side portions 24 and 124 are now mounted on the support 22 as aforementioned and the plenum chamber is remounted on the support 22 by lowering the plenum chamber 50 so that the tubular portion 104 enters the entrance 58, the shaft 66 enters the aligned holes in the walls 52 and 54 and the exits 60 come into alignment with the entrances 40 of the passages 38 and 138. The plenum chamber 50 is secured in position by pulling the shaft 66 upwardly against the force of the spring 74 and holding it in position while the latching member 78 is moved into its locking position.

I claim:

1. A mould arrangement for use in a cyclicly operating glassware forming machine, the arrangement comprising two supports on each of which one of two opposed side portions of a mould is mounted, each side portion defining side portions of a cavity of the mould which has an upwardly-facing opening through which molten glass can be introduced into the cavity to be moulded to the shape of the cavity, the supports being movable in a cycle of operation of the machine to a first position thereof, in which the side portions engage one another to co-operate in defining the mould cavity so that moulding can take place, and to a second position thereof, in which the side portions are separated from one another so that the moulded glass can be removed from the mould, the side portions also defining cooling passages each extending downwardly from an entrance in an upper surface of the side portion so that air can pass through the passages to cool the side portion, wherein the mould arrangement also comprises two plenum chambers each of which is associated with a separate one of the supports and is mounted for movement therewith, each plenum chamber extending above the upper surface of the side portion mounted on its associated support without obstructing the opening of the cavity, each plenum chamber having one or more exits which open downwardly and communicate with the entrances of the cooling passages in said side portion so that air supplied to the plenum chamber is supplied to each cooling passage at substantially the same pressure, each plenum chamber also having an entrance connected to air supply means operable to blow air into the plenum chamber.

2. A mould arrangement according to claim 1, wherein each plenum chamber is mounted on its associated support and the portion of the plenum chamber defining the exit or exits thereof is urged into contact with the upper surface of the side portion by resilient means.

3. A mould arrangement according to claim 1, wherein each side portion is mounted on its support by means of a hook portion of the side portion which projects horizontally above the support and has a downward projection which is received in an upwardly-opening recess of the support, and wherein the plenum chambers are mounted so that they project over said hook portion, the plenum chambers being removable from the supports to allow mounting of the side portions on the supports or removal of the side portions from the supports.

4. A mould arrangement according to claim 3, wherein each support is mounted for limited pivoting movement about a vertically-extending shaft which is movable with the support, wherein the shaft projects upwardly through aligned holes in bottom and top walls of the plenum chamber and defines a recess above said top wall which is arranged to receive a latching member mounted on said top wall for movement between a locking position thereof, in which the latching member enters the recess in the shaft and thereby locks the plenum chamber to the shaft, and an out-of-the way position thereof, in which the latching member allows the plenum chamber to be mounted on the support or to be removed therefrom.

5. A mould arrangement according to claim 4, wherein the shaft is urged downwardly of the support by resilient means so that, when the latching member is in its locking position, the portion of the plenum chamber defining the exit or exits thereof is urged into contact with the upper surface of the side portion.

6. A mould arrangement according to claim 1, wherein the entrance of each plenum chamber is connected to the air supply means through a valve which is arranged to allow air to enter the plenum chamber for a predetermined time in each cycle of operation of the machine.

7. A mould arrangement according to claim 1, wherein the air supply means is connected to a tubular portion of the support which is arranged to enter the entrance of the plenum chamber when the plenum chamber is mounted on the support, the arrangement also comprising a sealing member arranged to seal the gap between the exterior of the tubular portion and the plenum chamber walls.

8. A mould arrangement according to claim 1, wherein the support comprises a partially-spherical bearing on which an end portion of an air supply tube of the air supply means is mounted, an opposite end portion of the air supply tube being mounted on a partially-spherical bearing on the frame of the machine so that the tube communicates with a chamber within the frame to which air under pressure is supplied.

9. A mould arrangement according to claim 1, wherein each cooling passage extends substantially in a straight line between its entrance and and exit thereof to atmosphere so that the mass flow of air in the passage is determined by the cross-sectional area and length of the passage and entrance and exit configurations of the passge.

10. A mould arrangement according to claim 1, wherein the Reynolds number for air flowing through the cooling passages is arranged to be greater than 10,000.

11. A mould arrangement according to claim 1, wherein the air supply means is arranged to create a pressure of up to 2 lbs per square inch (1400 mm of water) at the exit or exits of each plenum chamber.

12. A mould arrangement according to claim 1, wherein each plenum chamber has a maximum cross-sectional area transversely to the direction of air flow therein which is at least three times the combined cross-sectional areas of the cooling passages supplied from the plenum chamber.

* * * * *